United States Patent
Liu et al.

(10) Patent No.: US 12,493,004 B2
(45) Date of Patent: Dec. 9, 2025

(54) METHOD FOR DETERMINING PARAMETERS OF THREE DIMENSIONAL NANOSTRUCTURE AND APPARATUS APPLYING THE SAME

(71) Applicant: INDUSTRIAL TECHNOLOGY RESEARCH INSTITUTE, Hsinchu (TW)

(72) Inventors: Chun-Ting Liu, Taichung (TW); Po-Ching He, Hsinchu (TW); Wei-En Fu, Taoyuan (TW); Chun-Yu Liu, Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 279 days.

(21) Appl. No.: 18/374,289

(22) Filed: Sep. 28, 2023

(65) Prior Publication Data

US 2024/0102950 A1   Mar. 28, 2024

Related U.S. Application Data

(60) Provisional application No. 63/410,667, filed on Sep. 28, 2022.

(30) Foreign Application Priority Data

May 29, 2023 (TW) .................. 112119892

(51) Int. Cl.
*G01N 23/201* (2018.01)
*G01B 15/04* (2006.01)
(Continued)

(52) U.S. Cl.
CPC ........... *G01N 23/201* (2013.01); *G01B 15/04* (2013.01); *G01N 23/2273* (2013.01);
(Continued)

(58) Field of Classification Search
CPC .. G01B 15/04; G01N 23/201; G01N 23/2273; G01N 2223/052; G01N 2223/1016; H01L 21/66; H01L 22/12
See application file for complete search history.

(56) References Cited

U.S. PATENT DOCUMENTS

| 6,771,735 B2 | 8/2004 | Janik et al. |
| 6,987,832 B2 | 1/2006 | Koppel et al. |
(Continued)

FOREIGN PATENT DOCUMENTS

| CN | 104081193 B | 9/2017 |
| CN | 110036284 A | 7/2019 |
(Continued)

OTHER PUBLICATIONS

Taiwanese Office Action and Search Report for Taiwanese Application No. 112119892, dated Oct. 23, 2023.
(Continued)

*Primary Examiner* — Jurie Yun
(74) *Attorney, Agent, or Firm* — Birch, Stewart, Kolasch & Birch, LLP (57) ABSTRACT

A method for determining parameters of nanostructures, wherein the method includes steps as follows: Firstly, an X-ray reflection intensity measurement curve of a nanostructure to be tested is obtained by radiating the nanostructure to be tested with X-ray. The X-ray reflection intensity measurement curve is compared with an X-ray reflection intensity standard curve to obtain a comparison result. Subsequently, at least one parameter existing in the nanostructure to be tested is determined according to the comparison result.

16 Claims, 5 Drawing Sheets

(51) Int. Cl.
 *G01N 23/2273* (2018.01)
 *H01L 21/66* (2006.01)
(52) U.S. Cl.
 CPC ........ *H01L 22/12* (2013.01); *G01N 2223/052* (2013.01); *G01N 2223/1016* (2013.01)

(56) References Cited

U.S. PATENT DOCUMENTS

| | | |
|---|---|---|
| 7,139,365 B1 | 11/2006 | Janik |
| 7,558,371 B2 | 7/2009 | Park et al. |
| 8,731,138 B2 | 5/2014 | Yokhin et al. |
| 9,588,066 B2 | 3/2017 | Pois et al. |
| 9,823,203 B2 | 11/2017 | Yun et al. |
| 10,119,925 B2 | 11/2018 | Pois et al. |
| 10,151,713 B2 | 12/2018 | Wu et al. |
| 11,036,898 B2 | 6/2021 | Chouaib et al. |
| 11,181,489 B2 | 11/2021 | Thompson et al. |
| 11,333,621 B2 | 5/2022 | Wack et al. |
| 11,460,418 B2 | 10/2022 | Kuznetsov et al. |
| 11,519,719 B2 | 12/2022 | Shchegrov et al. |
| 11,579,099 B2 | 2/2023 | Liu et al. |
| 2005/0195941 A1 | 9/2005 | Lischka et al. |
| 2012/0140889 A1 | 6/2012 | Wall et al. |
| 2016/0077025 A1 | 3/2016 | Zhang et al. |
| 2016/0341674 A1 | 11/2016 | Wu et al. |
| 2017/0167862 A1 | 6/2017 | Dziura et al. |
| 2017/0307548 A1 | 10/2017 | Bykanov et al. |
| 2017/0315055 A1 | 11/2017 | Tinnemans et al. |
| 2018/0106735 A1 | 4/2018 | Gellineau et al. |
| 2018/0188192 A1 | 7/2018 | Artemiev et al. |
| 2018/0299259 A1 | 10/2018 | Shchegrov et al. |
| 2018/0350699 A1 | 12/2018 | Gellineau et al. |
| 2020/0225151 A1 | 7/2020 | Wang et al. |
| 2021/0063329 A1 | 3/2021 | Kuznetsov et al. |
| 2021/0239629 A1 | 8/2021 | Chuang et al. |
| 2021/0310968 A1 | 10/2021 | Kuznetsov et al. |
| 2022/0120561 A1 | 4/2022 | Liu et al. |
| 2022/0252395 A1 | 8/2022 | Hench et al. |

FOREIGN PATENT DOCUMENTS

| | | |
|---|---|---|
| EP | 2 443 651 B1 | 8/2015 |
| FR | 2.180.847 A1 | 11/1973 |
| JP | 2012-13659 A | 1/2012 |
| JP | 5504502 B2 | 5/2014 |
| TW | 201011278 A | 3/2010 |
| TW | I444589 B | 7/2014 |
| TW | 201602514 A | 1/2016 |
| TW | I689702 B | 4/2020 |
| TW | 202124941 A | 7/2021 |
| TW | 202203281 A | 1/2022 |
| TW | I753490 B | 1/2022 |
| WO | WO 2017/203406 A1 | 11/2017 |

OTHER PUBLICATIONS

Freychet et al., "Estimation of Line Cross Sections Using Critical-Dimension Grazing-Incidence Small-Angle X-Ray Scattering", Physical Review Applied 12, 044026, 2019, pp. 044026-1-044026-8.

Gin et al., "Inline metrology of high aspect ratio hole tilt using small-angle x-ray scattering", Proc. of SPIE, 2022, vol. 12053, pp. 1205312-1 to 1205312-10.

International Search Report and Written Opinion of the International Searching Authority for International Application PCT/US22/80122, dated Feb. 14, 2023.

Lee et al., "Nanoimprint pattern transfer quality from specular x-ray reflectivity", Applied Physics Letters 87, 263111, 2005, pp. 263111-1-263111-3.

Lee et al., "X-ray Reflectivity Measurements of Nanoscale Structures: Limits of the Effective Medium Approximation", AIP Conference Proceedings 931, 209, 2007, pp. 209-215.

Leng et al., "Rapid X-Ray Reflectivity (XRR) characterization and Process Monitoring of Multilayer Ta/Al$_2$O$_3$/Ta/SiO$_2$/Si", Proceedings of SPIE, vol. 4449, 2001, pp. 244-252.

Taiwanese Office Action and Search Report for Taiwanese Application No. 109123688, dated Apr. 7, 2021.

Taiwanese Office Action and Search Report for Taiwanese Application No. 111134541, dated Feb. 16, 2023.

U.S. Office Action for U.S. Appl. No. 17/037,115, dated Jul. 14, 2022.

U.S. Office Action for U.S. Appl. No. 17/532,767, dated May 18, 2023.

Voegeli et al., "A quick convergent-beam laboratory X-ray reflectometer using a simultaneous multiple-angle dispersive geometry," Journal of Applied Crystallography, vol. 50, 2017, pp. 570-575.

METHOD FOR DETERMINING PARAMETERS OF THREE DIMENSIONAL NANOSTRUCTURE AND APPARATUS APPLYING THE SAME

This application claims the benefit of U.S. provisional application Ser. No. 63/410,667, filed Sep. 28, 2022, and Taiwan application Serial No. 112119892, filed May 29, 2023, the subject matters of which are incorporated herein by references.

BACKGROUND OF THE DISCLOSURE

Field of the Disclosure

The disclosure relates in general to a method and apparatus for determining parameters of nanostructures, and more particularly to a method and device for determining parameters of three-dimensional (3D) nanostructures.

Description of the Related Art

With the advancement of science and technology, the demand for integrated circuits is increasing. Due to the limitation of the area size of planar semiconductor components, a three-dimensional (3D) stacking structure has been developed to increase the integrity and density per unit area of integrated circuits.

To take an IC including a NAND memory array as an example, in order to increase the memory density of the NAND memory array without increasing the area of the IC, in addition to shrinking the size of the individual NAND memory units, another way is to continuously increase the number of stacked layers of the NAND memory array, so that the NAND memory array can accommodate more NAND memory units per unit area.

However, increasing the number of stacked layers of the NAND memory array will result in an increase in the thickness of the NAND memory array. In addition, because the wavelength is too long and the energy is not enough to penetrate the NAND memory array material, the existing optical measurement technology using visible light will not be able to detect whether there are component size deviations in the underlying structure caused by stress or process failures.

Therefore, there is a need to provide an advanced 3D nanostructure parameters determining method and apparatus applying the same to overcome the drawbacks of the prior art.

SUMMARY OF THE DISCLOSURE

One embodiment of the present disclosure is to provide a method for determining parameters of nanostructures, wherein the method includes steps as follows: Firstly, an X-ray reflection intensity measurement curve of a nanostructure to be tested is obtained by radiating the nanostructure to be tested with X-ray. The X-ray reflection intensity measurement curve is compared with an X-ray reflection intensity standard curve to obtain a comparison result. Subsequently, at least one structural/process parameter (including the position, type and/or size of at least one structural feature) existing in the nanostructure to be tested is determined according to the comparison result.

Another embodiment of the present disclosure is to provide an apparatus for determining parameters of nanostructures, wherein the apparatus includes an X-ray light source, an X-ray reflector, an X-ray detector and a parameters determining module. The X-ray light source is used for emitting X-rays. The X-ray reflector is used to focus the X-rays on a surface of the nanostructure to be tested by adjusting the incident angle of the X-rays within a preset angle range. The X-ray detectors are used to collect X-ray reflections reflected from surfaces. The parameters determining module is used to perform the steps as follows: An X-ray reflection intensity measurement curve is obtained according to the X-ray reflections. The X-ray reflection intensity measurement curve is compared with an X-ray reflection intensity standard curve. Subsequently, at least one structural/process parameters of the nanostructure to be tested is determined according to the comparison result.

According to the above-mentioned embodiments, a method and apparatus for determining parameters of nanostructures are provided. Firstly, by adjusting different incident angles of X-rays to irradiate the nanostructure to be tested, the X-ray reflection intensity (electron density) in the Z-axis direction can be obtained, and a function curve of the X-rays reflection intensity that is associated with of the structural characteristics of the nanostructure to be tested can be then deduced. Next, the function curve of the nanostructure to be tested is compared with a theoretical function curve obtained by a computer simulation, or with a standard function curve obtained by actually measuring a standard nanostructure entity. Subsequently an analysis is performed to determine or/and predict the positions (such as, depth) of the structural features in the nanostructure to be tested and the degree of size deviation (such as, critical dimension deviation) thereof according to the comparison results. Therefore, the cost for determining parameters of the 3D nanometer structure can be simplified and reduced.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides a method and apparatus for determining parameters of nanostructures using 2D X-ray reflection technology to measure structural features in a 3D nanostructure, so as to simplify and reduce the cost of determining parameters of the three-dimensional nanostructure. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1:
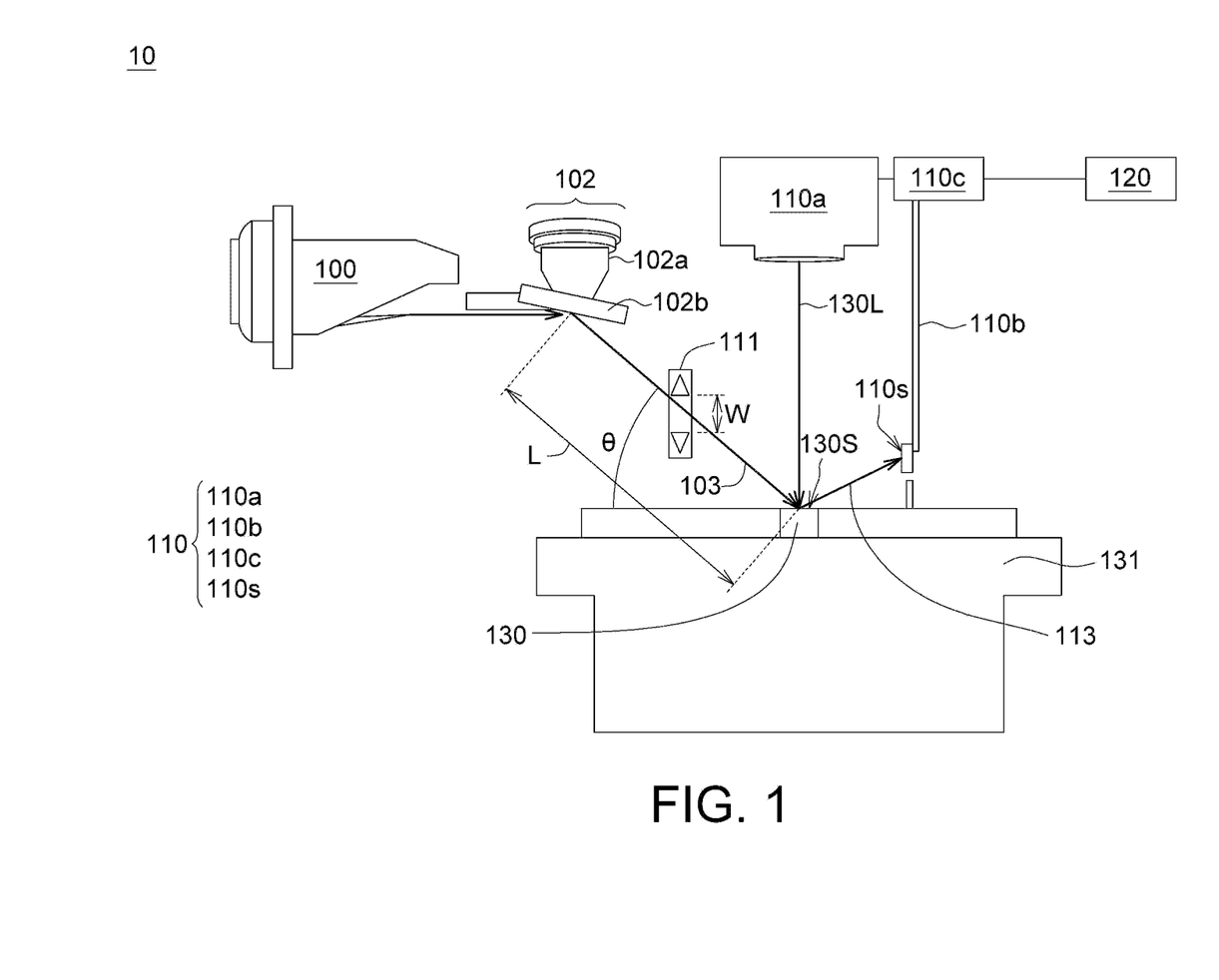
FIG. 1 is a schematic diagram illustrating an apparatus for determining parameters of nanostructures according to one embodiment of the present disclosure.

Referring to FIG. 1, FIG. 1 is a schematic diagram illustrating an apparatus 10 for determining parameters of nanostructures according to one embodiment of the present disclosure. The apparatus 10 for determining parameters of nanostructures (also referred to as nanostructure parameters determining apparatus 10) includes an X-ray light source 100, an X-ray reflector 102, an incident slit 111, an X-ray detector 110 and a parameters determining module 120.

The X-ray light source 100 is used for emitting X-rays 103 with a light wavelength smaller than 0.154 nm. For example, in some embodiments of the present disclosure, the X-rays 103 may be X-rays generated by using copper (Cu) as a target material (for example, the radiation energy may be about 8000 eV). In one embodiment of the present disclosure, the X-rays 103 may be X-rays generated by using silver (Ag) as a target material (for example, the radiation energy may be about 22.1629 keV). In yet another embodiment of the present disclosure, the X-rays 103 may be fan-shaped X-rays generated by using indium (In) or gallium (Ga) as a target (for example, the radiation energy may be about 66.831 keV). However, the radiation energy and form of the X-rays 103 are not limited thereto.

The X-ray reflector 102 is used to focus the X-rays 103 on a surface 130S of a sample (for example, a nanostructure to be tested) 130. After the X-rays 103 are reflected by the surface 130S, they can be converted into X-ray reflection lines 113, and form a scattering image projected on a detecting surface 110s of the 2D X-ray detector 110 movably assembled on the three-axis moving device 110b.

For example, in the present embodiment, the X-ray reflector 102 may include a monochromator having multiple sets (≥2 sets) mirrors 102b or Rowland circles with a diameter 500 mm and controlled by a six-axis platform 102a, which can make the focusing distance (working distance) L of the X-rays 103 with a wavelength of 0.154 nm greater than or equal to 150 mm (≥150 mm), and make the X-rays 103 focused in an area of ≥74 square millimeters (mm²). Such that, the focused X-rays 103 can pass through the 3D nanostructures with multiple layers. For example, the focused X-rays 103 can penetrate a 3D NAND memory array with 100 layers, each has a thickness of 30 nm.

In some embodiments of the present disclosure, the mirrors 102b may include (but not limited to) X-ray collimating mirrors, refractive X-ray optical elements, diffractive optical mirrors, Schwarzschild optical mirrors, Kirkpatrick-Baez optical mirrors, Montel mirror optics, Wolter optical mirrors, mirrored X-ray optics, etc. serving as ellipsoidal mirrors, polycapillary optics, multilayer optics or systems.

The X-rays 103 have an adjustable incident angle θ within a predetermined range. The incident slit 111 is disposed between the X-ray reflector 102 and the surface 130S of the sample 130, and the divergence angle of the X-rays 103 are adjusted by the width of the incident slit 111; the detection slit (not shown) is disposed between the X-ray detector 110 and the surface 130S of the sample 130 to adjust the divergence angle Φ of the X-ray reflected lines 113.

The incident angle θ of the X-rays 103 is adjustable within a preset angle range (for example, within a range of 1° to 45°). When the incident angle θ changes, the incident beam divergence angle δθ of the X-rays 103 is adjusted according to the incident angle θ. Wherein, the incident slit 111 may be an aperture optical element or a slit element controlled by uniaxial piezoelectricity. The incident beam divergence angle δθ of the X-rays 103 is controlled by the opening size of the incident slit 111. The incident beam divergence angle δθ may be a tangent function of the incident angle θ. The incident beam divergence angle δθ is controlled by the width W of the incident slit 111 to adjust the reflection of the X-rays 103 reflected by the surface 130S, and adjust the divergence angle φ of the X-ray reflected lines 113. For example, in the present embodiment, the incident beam divergence angle δθ of the X-rays 103 may be the tangent function of the incident angle θ multiplied by a constant K (i.e., δθ=K×tan θ).

For example, in some embodiments of the present disclosure, the sample (e.g., the nanostructure to be tested) 130 can be placed on the sample stage 131, and to be driven rotating around the axis 130L (X-axis) parallel to the surface 130S of the sample 130. Such that, the X-rays 103 can radiate on to the surface 130S of the sample 130 at different incident angles θ, and then be reflected by and scattered from the surface 130S.

The X-ray detector 110, including an X-ray photoelectron spectrometer (XPS) and/or an X-ray fluorescence spectrometer, can (within a predetermined range of incident angle θ) collect and measure the light reflection intensity of the X-ray reflection lines 113 after the X-rays 103 is reflected by the surface 130S of the sample (e.g., the nanostructure to be measured) 130, and calculate the specular reflection value component and the non-specular reflection value component of the X-ray reflection rays 113 corresponding to each incident angle θ. After the non-specular reflection value components are removed from the total reflection intensity, the remaining specular reflection value components corresponding to each incident angle θ can be integrated to obtain the measured specular reflection intensity for each corresponding incident angle θ.

For example, in some embodiments of the present disclosure, the X-ray detector 110 may be a 2D X-ray reflectometer. The X-ray detector 110 includes an alignment system 110a, a three-axis moving device 110b, and an X-ray detection chip 110c. The alignment system 110a is used to align the surface 130S of the sample (e.g., the nanostructure to be tested) 130 and calculate the divergence angle φ of the X-ray reflection lines 113. The three-axis moving device 110b is used to control the three-axis movement of the X-ray detecting surface 110s in at least one of the X-axis, Y-axis and Z-axis, so that the X-ray reflection lines 113 can be accurately projected to the detecting surface 110s of the 2D X-ray detector 110 to collect and measure the photoelectric signal generated by the X-ray reflection lines 113. Subsequently, an electron density distribution 200 (as shown in FIG. 2) can be provided by the X-ray detection chip 110c can obtain according to the photoelectric signal.

The X-ray reflection lines 113 includes the specularly reflected X-rays and the non-specularly reflected X-rays or the scattered X-rays, after the X-ray ray 103 are reflected by the surface 130S of the sample 130. Wherein, the non-specularly reflected X-rays or the scattered X-rays come from the limited lateral scattering components Qx and Qy that depends upon a limited coherence length and the complex 3D nanostructures. The specularly reflected X-rays come from the longitudinal scattering component Qz.

Figure 2:
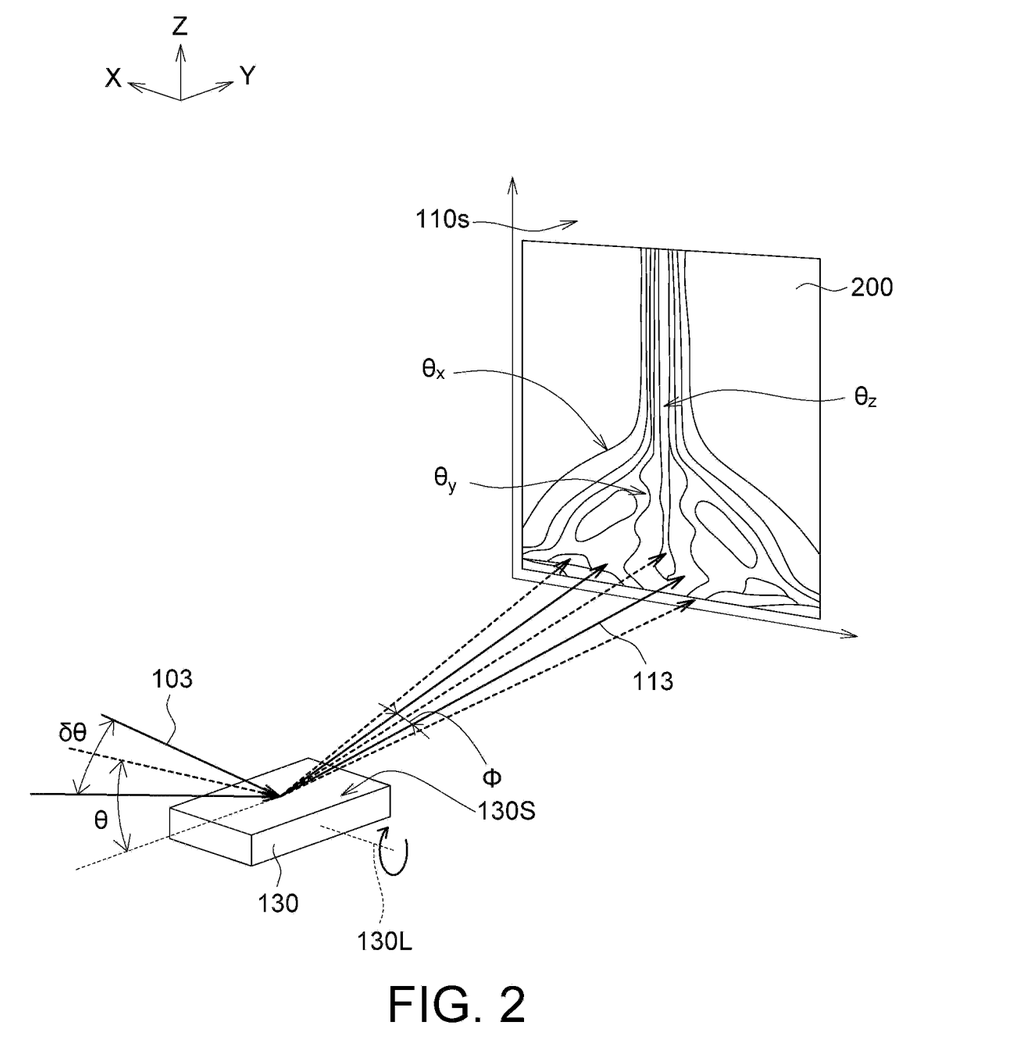
FIG. 2 is a diagram illustrating a scattering image of reflection of X-rays reflection lines, after X-rays irradiating on a surface of a sample (for example, a nanostructure to be tested) are reflected and then projected onto a surface of a two-dimensional (2D) X-ray detector, according to one embodiment of the present disclosure. Wherein, an electron density distribution can be obtained according to the X-ray intensity distribution of the scattering image.

Refer to FIG. 2, FIG. 2 is a diagram illustrating a scattering image of the X-ray reflection lines 113, after the X-rays 103 irradiating the surface 130S of the sample (e.g., the nanostructure to be tested) 130 are reflected and then projected onto the detecting surface 110s of the 2D X-ray detector 110, according to one embodiment of the present disclosure. Wherein, the electron density distribution 200 can be obtained according to the X-ray intensity distribution of the scattering image. In the present embodiment, an X-ray photoelectron spectrometer (XPS) is used to collect and measure the lateral scattering components Qx and Qy and the longitudinal scattering component Qz of the X-ray reflection rays 113. The lateral scattering components Qx and Qy is removed from the measured background value including the non-specular refection signal, and only the longitudinal scattering component Qz remained is then integrated. And the critical dimension (CD) of the 3D NAND (e.g., the nanostructure to be tested) can be obtained by curve fitting the integrated signal with the average value of the density of the 3D NAND.

Figure 3A:
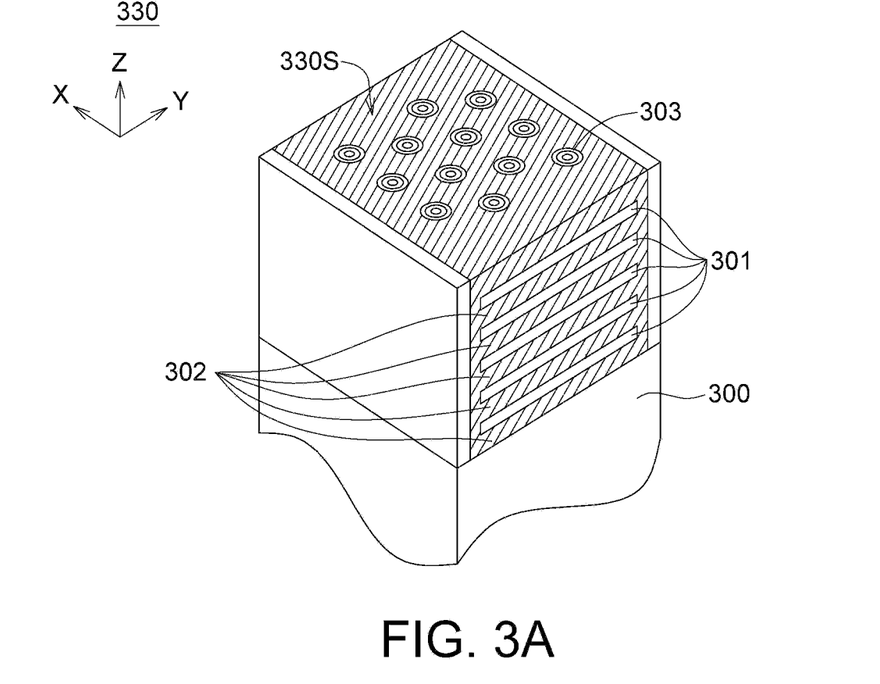
FIG. 3A is a perspective view illustrating a partial structure of a nanostructure to be tested according to one embodiment of the present disclosure.
Figure 3B:
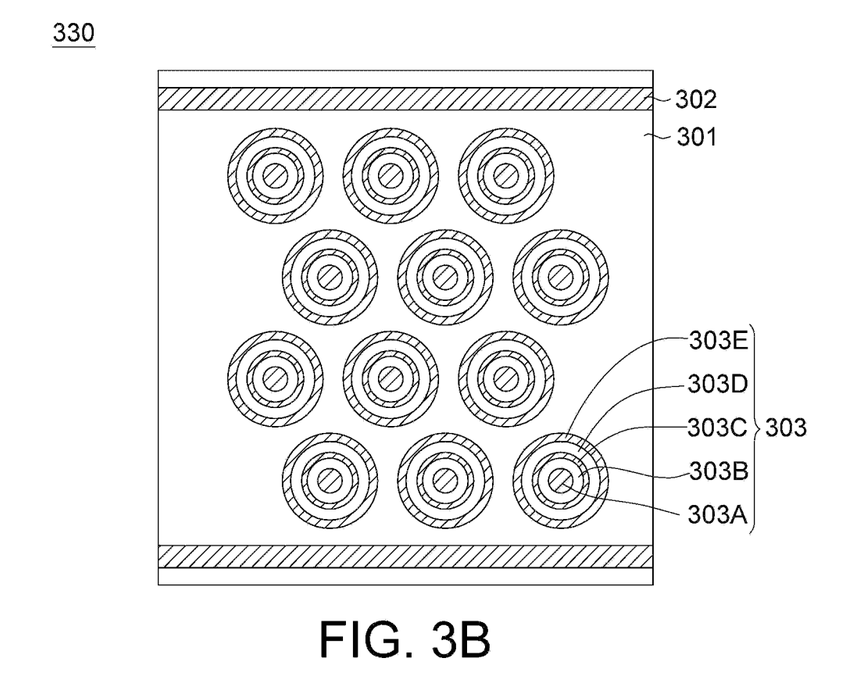
FIG. 3B is a horizontal-sectional view illustrating the partial structure of the nanostructure to be tested as depicted in FIG. 3A.

Refer to FIG. 3A and FIG. 3B, FIG. 3A is a perspective view illustrating a partial structure of a nanostructure to be tested 330 according to one embodiment of the present disclosure; and FIG. 3B is a horizontal-sectional view (parallel to the X-Y plane) illustrating the partial structure of the nanostructure to be tested 330 as depicted in FIG. 3A. In the present embodiment, the nanostructure to be tested 330 may be a multilayer (for example, 6 layers) structure including a plurality of conductive layers (for example, tungsten metal layers) 301 and a plurality of dielectric layers (for example, silicon oxide layers) 302 stacked alternately on a silicon substrate 300. The nanostructure to be tested 330 further includes a plurality of memory cell strings 303, perpendicular to the stacking direction of the conductive layer 301 and the dielectric layer 302, and vertically penetrating through the conductive layer 301 and the dielectric layer 302. Wherein, each of the memory strings 303 includes a silicon dioxide pillar 303A, a polysilicon layer 303B, a silicon dioxide layer 303C, a silicon nitride layer 303D and a silicon dioxide layer 303E arranged concentrically from the inside to the outside.

The method for determining parameters of nanostructures described in the present disclosure is to use the apparatus 10 for determining parameters mentioned above to obtain an X-ray reflection intensity (electron density) of the nanostructure to be tested 300 in the Z-axis direction at different incident angles θ; and to determine, analyze or/and to predict the positions (such as, depth) of the structural features (such as a multilayer structure) in the nanostructure to be tested 300 and the degree of size deviation (such as, critical dimension deviation) thereof, according to the functional relationship between the X-ray reflection intensity (electron density) and the incident angle.

Figure 4:
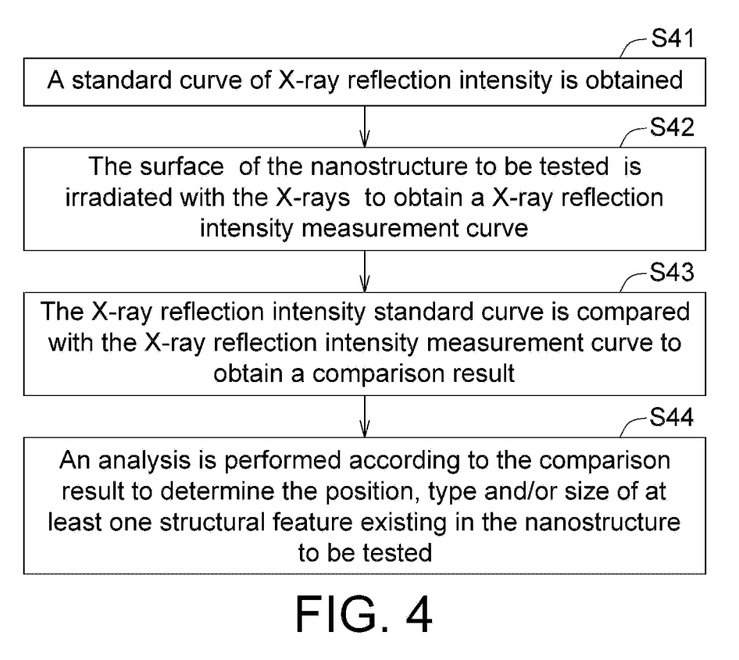
FIG. 4 is a flow chart illustrating a method for determining parameters of nanostructures according to one embodiment of the present disclosure.

Refer to FIG. 4, FIG. 4 is a flow chart illustrating a method for determining parameters of nanostructures according to one embodiment of the present disclosure. The method for determining parameters of nanostructures includes steps as follows: Firstly, referring to step S41: An X-ray reflection intensity standard curve 501 is obtained. Wherein, the X-ray reflection intensity standard curve 501 can be obtained by an actual measurement or a computer simulation.

For example, in some embodiments of the present disclosure, the X-ray reflection intensity standard curve 501 can be obtained by actually measuring the physical standard nanostructure. The standard nanostructure described here refers to the solid nanostructure (not shown) which has the same specifications (for example, the same profile structural size, material configuration, etc.) as the nanostructure to be tested 330, and meets the specified quality standards for mass production of the nanostructure to be tested 330.

The method for obtaining the X-ray reflection intensity standard curve 501 of the standard nanostructure by actual measurement, includes using the method and apparatus 10 for determining parameters of nanostructures (as described in FIGS. 1 to 2 above) to performed steps as follows: Firstly, the X-rays 103 is irradiated onto the surface (not shown) of the physical standard nanostructure, and the X-ray detector 110 (e.g., an X-ray photoelectron spectrometer (XPS) is used to collect and detect the specular reflection Intensity (which can be converted into an electron density) of the reflected X-rays 103, the electron density detected by the XPS (removing the lateral scattering components Qx and Qy, and only taking the longitudinal specular reflection component Qz) is integrated to obtain a functional relationship curve between the incident angle θ and the specular reflection intensity.

In the present embodiment, since the specular reflection intensity of the X-rays 103 can be directly proportional to the current (nth power) generated in the XPS, it is also proportional to the X-ray photoelectron spectroscopy It is directly proportional to the number of photons (counts per second, CPS) collected by the XPS. Therefore, as shown in FIG. 5, the X-ray reflection intensity standard curve 501 can be the functional relationship curve between the (vertical axis) CPS collected by the XPS and the (horizontal axis) specular reflection component (the longitudinal scattering component $Qz=(4\pi/\lambda)\sin\theta$).

In other embodiments of the present disclosure, the X-ray reflection intensity standard curve 501 of the standard nanostructures can be obtained by a computer simulation. The method of obtaining the X-ray reflection intensity standard curve 501 of the standard nanostructures by computer simulation may include constructing a simulated nanostructure (not shown) with the same the same specifications (for example, the same profile structural size, material configuration, etc.) as the nanostructure to be tested 330, according to the theoretical model and the actual structure and/or process requirements for forming the nanostructure to be tested 330, and using various semiconductor structure configurations, process parameters, structural parameters, material parameters, optical parameters and other parameters stored in the database. And a simulation is then performed using a computer simulation system or an artificial intelligence (AI), such as machine learning (machine learning) module, during which the X-rays irradiate on the simulated nanostructure under the condition of meeting the specified quality standard and process requirements; and a functional relationship curve between the CPS collected by the XPS and the specular reflection component (the longitudinal scattering component Qz) can be thus obtained.

Next, referring to step S42 in FIG. 4: the surface 330S of the nanostructure to be tested 330 is irradiated with the X-rays 103 to obtain an X-ray reflection intensity measurement curve 502. In one embodiment of the present disclosure, the method for obtaining the X-ray reflection intensity measurement curve 502 of the nanostructure to be tested 330 includes using the method and apparatus 10 for determining parameters of nanostructures (as described in FIGS. 1 to 2 above) to performed steps as follows: Firstly, the X-rays 103 is irradiated onto the surface 330S of the nanostructure to be tested 330, and the X-ray detector 110 (e.g., an XPS) is used to collect and detect the specular reflection Intensity (which can be converted into an electron density) of the reflected X-rays 103, the electron density detected by the XPS (removing the lateral scattering components Qx and Qy, and only taking the longitudinal specular reflection component Qz) is integrated to obtain a functional relationship curve between the incident angle θ and the specular reflection intensity.

Figure 5:
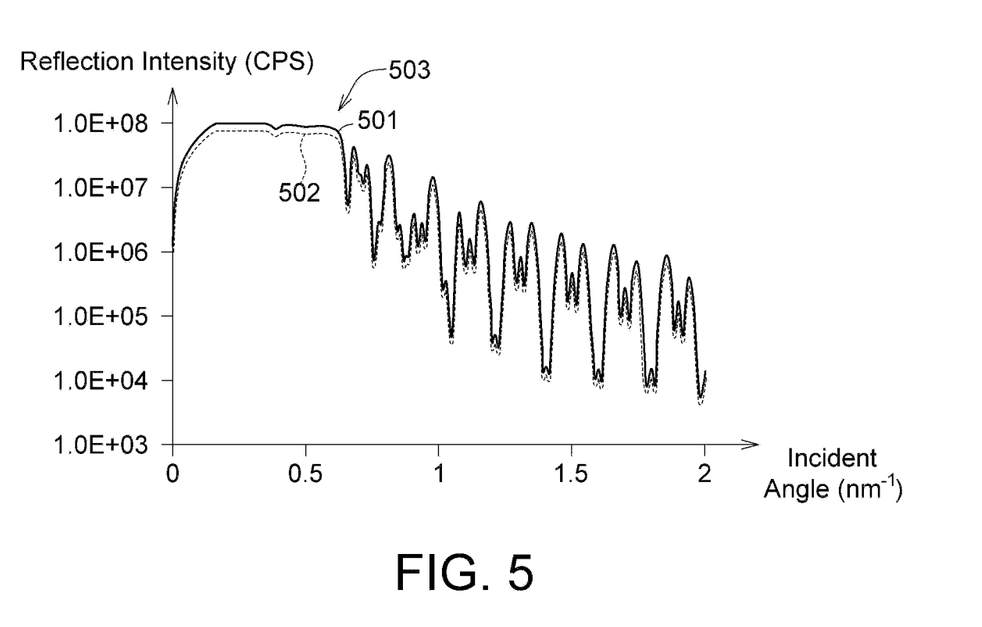
FIG. 5 is a diagram illustrating an X-ray reflection intensity measurement curve and an X-ray reflection intensity standard curve obtained by using the apparatus as depicted in FIG. 1 according to one embodiment of the present disclosure.

In the present embodiment, the X-ray reflection intensity measurement curve 502, as the X-ray reflection intensity standard curve 501, is the function relationship curve between the (vertical axis) CPS collected by the XPS and the (horizontal axis) specular reflection component (the longitudinal scattering component $Qz=(4\pi/\lambda)\sin\theta$) (as shown in FIG. 5).

Afterwards, referring to step S43 as shown in FIG. 4: The X-ray reflection intensity standard curve 501 is compared with the X-ray reflection intensity measurement curve 502 to obtain a comparison result. In some embodiments of the present disclosure, the comparison result of the X-ray reflection intensity standard curve 501 and the X-ray reflection intensity measurement curve 502 includes obtaining a difference curve of reflection intensity by subtracting the X-ray reflection intensity standard curve 501 from the X-ray reflection intensity measurement curve 502.

Figure 6:
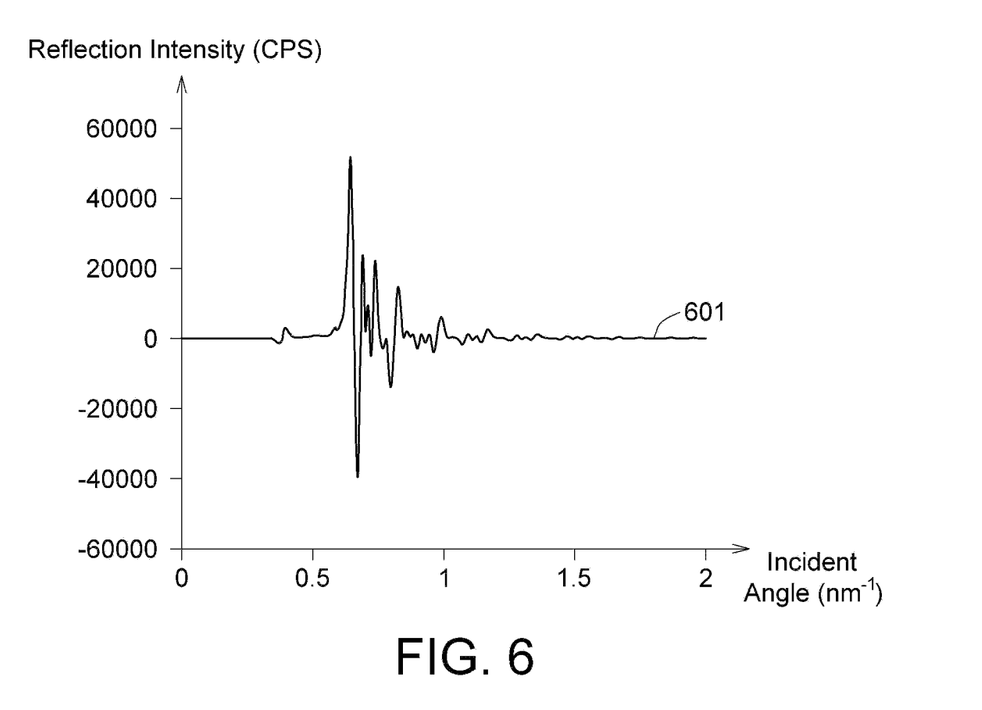
FIG. 6 is a diagram illustrating a difference curve of reflection intensity obtained by subtracting the X-ray reflection intensity standard curve from the X-ray reflection intensity measurement curve as depicted in FIG. 5.

For example, referring to FIG. 6, FIG. 6 is a diagram illustrating a difference curve of reflection intensity obtained by subtracting the X-ray reflection intensity standard curve 501 from the X-ray reflection intensity measurement curve 502 as depicted in FIG. 5. Since the structure and material specifications of the nanostructure to be tested 300 are same as that of the standard nanostructure. Theoretically, these two curves should substantially overlap. If there exists at least one structural feature in the nanostructure to be tested 300, there will be a significant difference in X-ray reflection intensity (for example, a maximum reflection intensity difference) at the critical angle 503, between both the X-ray reflection intensity standard curve 501 and the X-ray reflection intensity measurement curve 502.

Referring to step S44 as shown in FIG. 4: An analysis is performed according to the comparison result to determine the position, type and/or size of at least one structural feature existing in the nanostructure to be tested 300. In the present embodiment, the position, type and/or size of structural features existing in the nanostructure to be tested 300 can be determined through the difference in X-ray reflection intensity of the comparison result.

For example, in some embodiments of the present disclosure, the critical dimension deviation between the nanostructure to be tested 300 and the standard nanostructure can be determined by referring the X-ray reflection intensity difference (the maximum reflection intensity difference) at the critical angle 503 between the X-ray reflection intensity standard curve 501 and the X-ray reflection intensity measurement curve 502, as well as the X-ray and the equivalent density function of the X-ray reflection intensity measurement curve 502. Wherein, the equivalent density function is:

$$\rho_{EMA} = \frac{\sum_i A_i \rho_i}{\sum_i A_i} = \frac{A_{SiO_2}\rho_{SiO_2} + A_{Poly\,Si}\rho_{Poly\,Si} + A_{Si_3N_4}\rho_{Si_3N_4} + A_{TiN}\rho_{TiN}}{A_{SiO_2} + A_{Poly\,Si} + A_{Si_3N_4} + A_{TiN}}$$

Among them, $\rho_{EMA}$ is the total equivalent density of the nanostructure to be tested 300, $\rho_i$ ($\rho_{SiO_2}$, $\rho_{PolySi}$, $\rho_{Si_3N_4}$ and $\rho_{TiN}$) is the electron density corresponding to the different materials constituting the nanostructure to be tested 300; $A_i$ ($A_{SiO_2}$, $A_{PolySi}$, $A_{Si_3N_4}$ and $A_{TiN}$) is the surface area corresponding to the different materials constituting the nanostructure to be tested 300. The $\rho_{EMA}$ of the nanostructure to be tested 300 is proportional to the specular reflection intensity at the critical angle 503 of the X-ray reflection intensity measurement curve 502 or the maximum reflection intensity difference.

In the present embodiment, the standard specification of the memory string 303 of the nanostructure to be tested 300 (that is, the specification of the standard nanostructure) are as follows: The radius of the silicon dioxide pillar 303A is 23 nm; the thickness of the polysilicon layer 303B is 15 nm; the thickness of silicon dioxide layer 303C is 4 nm; the thickness of silicon nitride layer 303D is 8 nm; the thickness of silicon dioxide layer 303E is 8 nm. The surface area $A_{SiO_2}$ of the silicon dioxide pillar 303A is $(23^2\pi\times\frac{1}{2})$; the surface area $A_{Poly\,Si}$ of the polysilicon layer 303B is $(38^2\pi-23^2\pi\times\frac{1}{2})$; the surface area $A_{SiO_2}$ of the silicon oxide layer 303C is $(42^2\pi-38^2\pi\times\frac{1}{2})$; the surface area $A_{Si_3N_4}$ of the silicon nitride layer 303D is $(50^2\pi-42^2\pi\times\frac{1}{2})$; The surface area $A_{SiO_2}$ of the silicon layer 303E is $(58^2\pi-50^2\pi\times\frac{1}{2})$. Under normal conditions, the total equivalent density of the standard nanostructure is 2.7676 g/cm³ ($\rho_{EMA}$=2.7676 g/cm³).

As other conditions remain unchanged, when the thickness of the silicon nitride layer 303D of the nanostructure to be tested 300 deviates, the total equivalent density $\rho_{EMA}$ of the nanostructure to be tested 300 may be changed correspondingly. For example, when the thickness of the silicon nitride layer 303D of the nanostructure to be tested 300 is increased by 0.1 nanometers (i.e., the thickness thereof is 8.1 nm), the measured total equivalent density of the nanostructure to be tested 300 is 2.7686 g/cm³ ($\rho_{EMA}$=2.7686 g/cm³). In another embodiment, when the thickness deviation of the silicon nitride layer 303D of the nanostructure to be tested 300 is decreased to 7.9 nm, the measured total equivalent density of the nanostructure to be tested 300 is 2.7667 g/cm³ ($\rho_{EMA}$=2.7667 g/cm³). Both of them are significantly different from the total equivalent density of standard nanostructures, however it exits a regularity (for example, a square function relationship) there between.

It can be seen that, by comparing the difference of the total equivalent density between of the nanostructure to be tested 300 and the standard nanostructure derived from the X-ray reflection intensity standard curve 501 and the X-ray reflection intensity measurement curve 502, it can not only determine whether there is a critical dimension deviation in the nanostructure to be tested 300, but also can determined which material in the nanostructure to be tested 300 causing the critical dimension deviation. Moreover, it can further determine what the range of the deviation is based on the change trend of the total equivalent density.

In another embodiment of the present disclosure, the method for determining parameters of nanostructure further includes a feature prediction which may include steps as follows: Firstly, a plurality of reflection intensity simulation curves (not shown) respectively corresponding a plurality of structural features (each corresponds to at least one parameter of known position, type and/or size) are obtained by using the method and apparatus 10 (as described in FIGS. 1 to 2 above) and adjusting different incident angles of X-rays to irradiate the structural features to determine the parameters existing therein. The information about the plurality of reflection intensity simulation curves is then stored in a database.

Next, a curve fitting is performed on the reflection intensity measurement curve 502 described in FIG. 5 and a plurality of reflection intensity simulation curves (not shown), so as to obtain a fitting result. In some embodiments of the present disclosure, an interpolation analysis, smoothing and/or regression analysis can be used to perform the fitting analysis (curve fitting) on the reflection intensity measurement curve 502 and the plurality of reflection intensity simulation curves, so as to select a reflection intensity simulation curve that is the closest to the reflection intensity measurement curve 502 from the plurality of reflection intensity simulation curves stored in the database.

According to the above fitting result, since it is inferred that the nanostructure to be tested 300 has the same types of structural features as the known nanostructure corresponding to the selected reflection intensity simulation curve; thus the positions, types and/or size of the structural features existing in the nanostructure to be tested 300 can be deduced by referencing that of the known nanostructures serving as a template. In some other embodiments of the present disclosure, an artificial intelligence (AI) technology can also be applied to establish a fitting model based on the aforementioned information stored in the database, for performing the above-mentioned feature prediction steps.

According to the above-mentioned embodiments, a method and apparatus for determining parameters of nanostructures are provided. Firstly, by adjusting different incident angles of X-rays to irradiate the nanostructure to be tested, the X-ray reflection intensity (which can be converted into an electron density) in the Z-axis direction can be obtained, and a function curve of the X-rays reflection intensity that is associated with of the structural characteristics of the nanostructure to be tested can be then deduced. Next, the function curve of the nanostructure to be tested is compared with a theoretical function curve obtained by computer simulation, or with a standard function curve obtained by actually measuring a standard nanostructure entity. Subsequently an analysis is performed to determine or/and predict the positions (such as, depth) of the structural features in the nanostructure to be tested and the degree of size deviation (such as, critical dimension deviation) thereof according to the fitting result. Therefore, the cost for determining parameters of the 3D nanometer structure can be simplified and reduced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for determining parameters of nanostructures, comprising:
   obtaining an X-ray reflection intensity measurement curve of a nanostructure to be tested by radiating the nanostructure to be tested with an X-ray;
   comparing the X-ray reflection intensity measurement curve with an X-ray reflection intensity standard curve to obtain a comparison result; and
   determining at least one parameter existing in the nanostructure to be tested according to the comparison result.

2. The method according to claim 1, wherein the step of obtaining an X-ray reflection intensity measurement curve comprises:
   focusing the X-rays on a surface of the nanostructure to be tested, wherein an incident angle of the X-ray is adjusted within a preset angle range, and an optical wavelength of the X-ray is less than 0.154 nm;
   using an x-ray detector to collect and measure a total reflection intensity of x-ray reflection lines reflected by the surface;
   calculating a plurality of non-specular reflection components of the X-ray reflection lines corresponding to different ranges of the incident angle; and removing the non-specular reflection components from the total reflection intensity; and integrating a remained portion of the total reflection intensity to obtain a specular reflection component; and
   adjust the incident angle with in the preset angle range, repeat above steps, and obtain a relationship curve between the incident angle and the specular reflection component as the X-ray reflection intensity measurement curve.

3. The method according to claim 2, wherein the comparison result comprises a difference curve of reflection intensity obtained by subtracting the X-ray reflection intensity standard curve from the X-ray reflection intensity measurement curve.

4. The method according to claim 3, wherein the difference curve of reflection intensity comprises a maximum reflection intensity difference at a critical angle of the X-ray reflection intensity measurement curve.

5. The method according to claim 4, wherein the step of determining at least one parameter comprises determining a critical dimension deviation in the nanostructure to be tested by referring the maximum reflection intensity difference and an equivalent density function of the X-ray reflection intensity measurement curve.

6. The method according to claim 5, wherein the equivalent density function is:

$$\rho_{EMA} = \frac{\sum_i A_i \rho_i}{\sum_i A_i}$$

wherein, $\rho_{EMA}$ is a total equivalent density of the nanostructure to be tested $\rho_i$ is an electron density of at least one material constituting the nanostructure to be tested; $A_i$ is a surface area of the at least one material on the surface.

7. The method according to claim 6, wherein the ρEMA is proportional to the maximum reflection intensity difference.

8. The method according to claim 6, further comprising:
obtaining a plurality of reflection intensity simulation curves respectively corresponding to a plurality of structural features, each of which corresponds to at least one parameter of known position, type and/or size;
performing a curve fitting on the reflection intensity measurement curve and the plurality of reflection intensity simulation curves, so as to obtain a fitting result; and
deducing a position, a type and/or a size of the at least one parameter existing in the nanostructure to be tested by referencing the fitting result.

9. The method according to claim 1, wherein the X-ray reflection intensity standard curve is obtained by using the X-rays to irradiate a standard nanostructure which has the same specifications as the nanostructure to be tested, and actually measuring its reflection intensity.

10. The method according to claim 1, wherein the X-ray reflection intensity standard curve is obtained by a computer simulation.

11. An apparatus for determining parameters of nanostructures, comprising:
an X-ray light source, used for emitting an X-ray
an X-ray reflector, used to focus the X-ray on a surface of a nanostructure to be tested by adjusting an incident angle of the X-ray within a preset angle range;
an X-ray detector, used to collect X-ray reflection lines reflected from surfaces; and
a parameters determining module used for:
obtaining an X-ray reflection intensity measurement curve according to a reflection intensity of the X-ray reflection lines;
comparing the X-ray reflection intensity measurement curve with an X-ray reflection intensity standard curve to obtain a comparison result; and
determining at least one parameter existing in the nanostructure to be tested according to the comparison result.

12. The apparatus according to claim 11, further comprising an incident slit disposed between the X-ray reflector and the surface; wherein a divergence angle of the X-ray is adjusted by a width of the incident slit.

13. The apparatus according to claim 11, further comprising a three-axis moving device used to control a three-axis movement of the X-ray detector in at least one of the X-axis, Y-axis and Z-axis to collect and measure the X-ray reflection lines.

14. The apparatus according to claim 11, wherein the X-ray has an optical wavelength less than 0.154 nm.

15. The apparatus according to claim 11, wherein the X-ray reflection intensity standard curve is obtained by using the X-rays to irradiate a standard nanostructure which has the same specifications as the nanostructure to be tested, and actually measuring its reflection intensity.

16. The apparatus according to claim 11, wherein the X-ray reflection intensity standard curve is obtained by a computer simulation.

* * * * *